United States Patent
Takeda et al.

(10) Patent No.: US 7,675,700 B2
(45) Date of Patent: Mar. 9, 2010

(54) DISK DRIVE DEVICE AND METHOD FOR PRODUCTION THEREOF

(75) Inventors: Sumie Takeda, Kanagawa (JP); Nobuya Matsubara, Kanagawa (JP); Nobuyuki Kitazaki, Kanagawa (JP); Toshifumi Kumano, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 13 days.

(21) Appl. No.: 12/079,497

(22) Filed: Mar. 26, 2008

(65) Prior Publication Data
US 2008/0239554 A1    Oct. 2, 2008

(30) Foreign Application Priority Data
Mar. 26, 2007    (JP) .............................. 2007-079930

(51) Int. Cl.
G11B 5/09    (2006.01)
G11B 5/596    (2006.01)
(52) U.S. Cl. .................... 360/48; 360/77.04; 360/77.08
(58) Field of Classification Search ........................ None
See application file for complete search history.

(56) References Cited

U.S. PATENT DOCUMENTS 6,493,173 B1 * 12/2002 Kim et al. ................ 360/77.04
2005/0275964 A1    12/2005 Hara
2006/0098330 A1    5/2006 Takaishi

* cited by examiner

Primary Examiner—Andrew L Sniezek
(74) Attorney, Agent, or Firm—Townsend and Townsend and Crew LLP; Patrick Duncan

(57) ABSTRACT

Embodiments of the present invention provide a magnetic disk device and a method for production thereof, the magnetic disk device being characterized in that the magnetic disk therein permits a plurality of tracks thereon to record correction data when necessary without decreasing its storage capacity. According to one embodiment, the magnetic disk device is characterized in that the magnetic disk has the first tracks and the second tracks formed thereon, the first tracks having servo data regions arranged cyclically, with a portion of a region between them being the correction data region and the remaining regions being the user data region, and the second tracks having the servo data regions arranged cyclically, with the region between them being the user data regions, and the multiprocessing unit (MPU) switches the servo extraction timing of the position information sampler depending on whether the track for servo reproduction by the magnetic head is the first track or the second track.

13 Claims, 10 Drawing Sheets

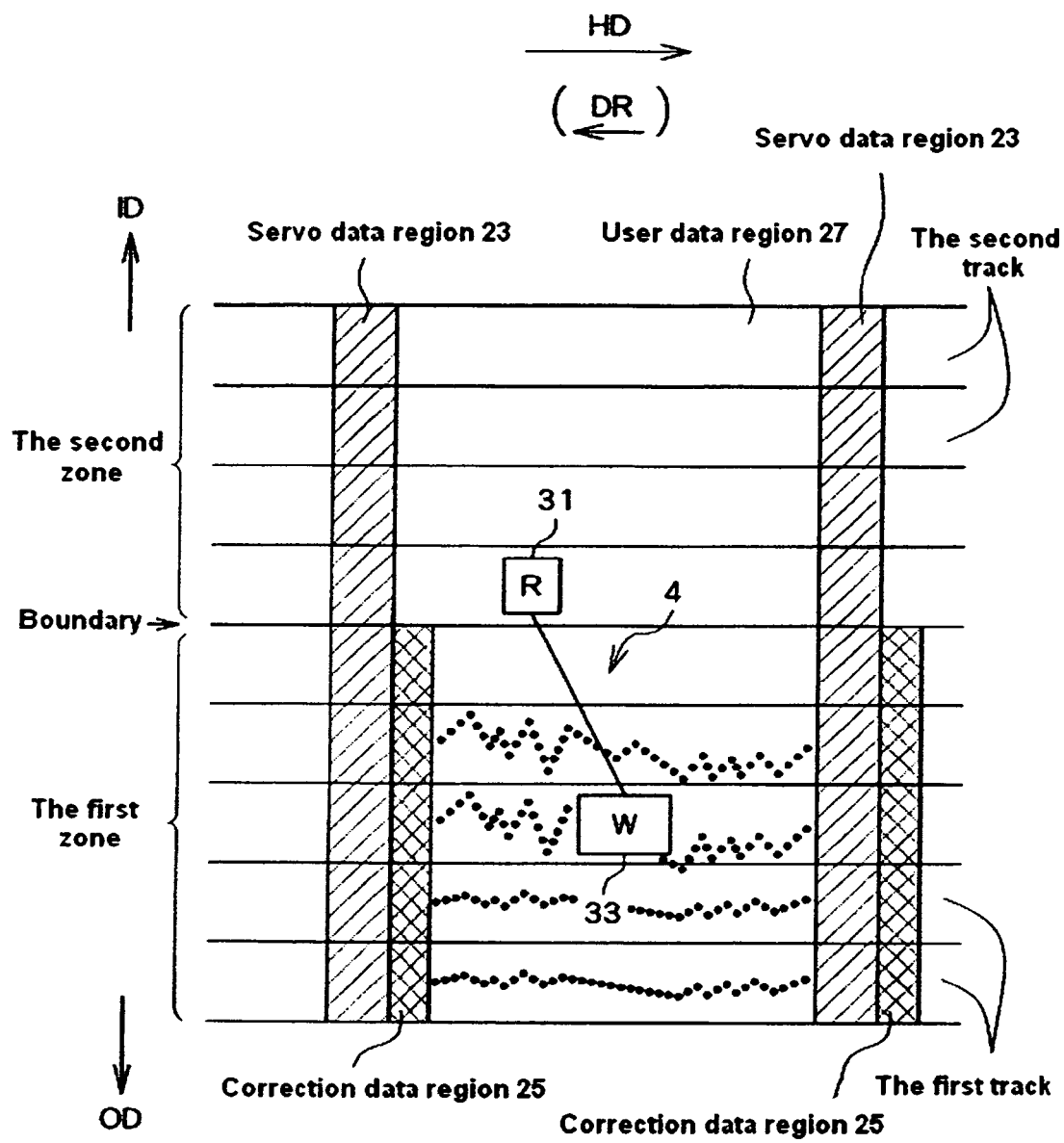

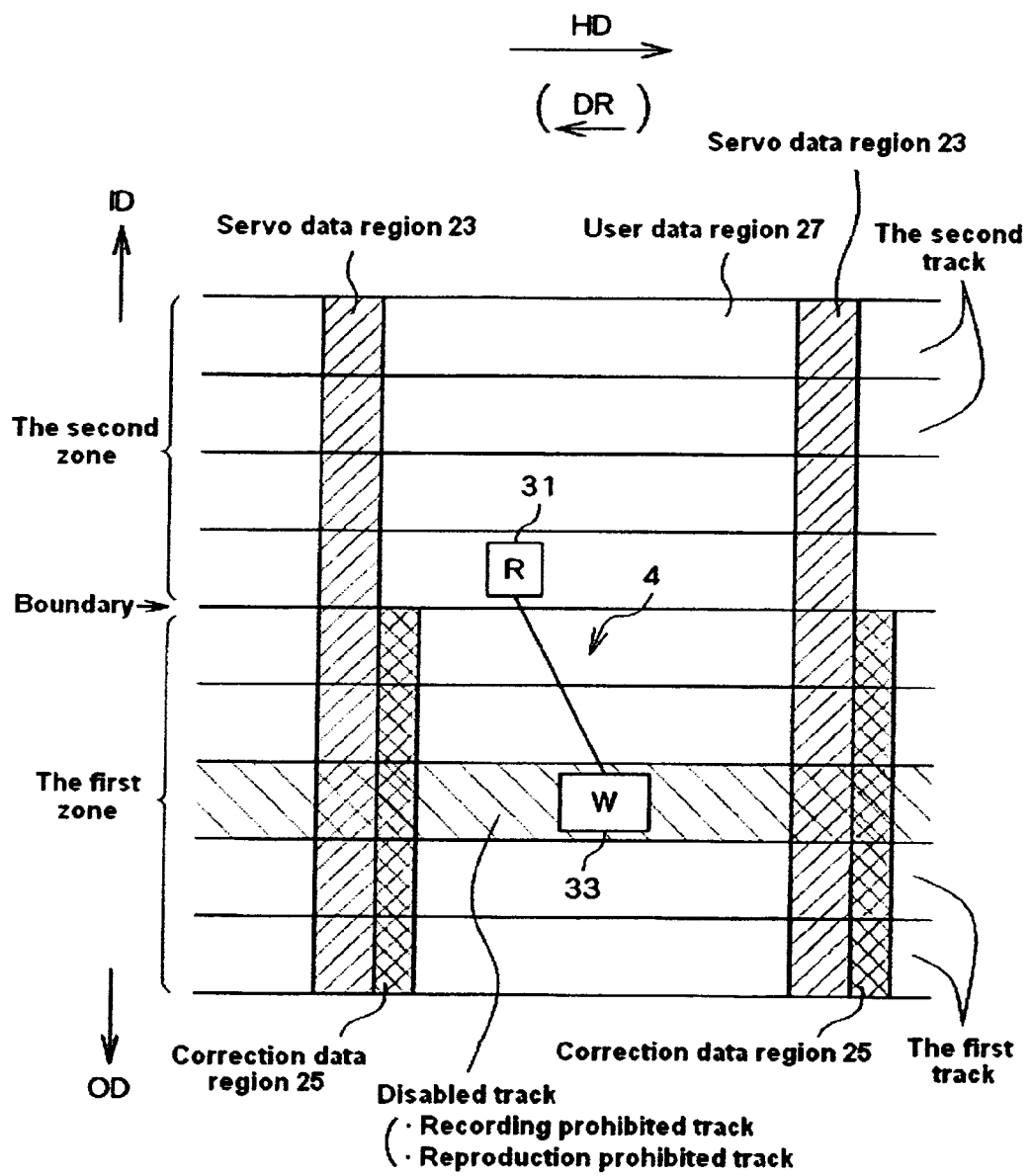

DISK DRIVE DEVICE AND METHOD FOR PRODUCTION THEREOF

CROSS-REFERENCE TO RELATED APPLICATION

The instant nonprovisional patent application claims priority to Japanese Patent Application No. 2007-079930 filed Mar. 26, 2007 and which is incorporated by reference in its entirety herein for all purposes.

BACKGROUND OF THE INVENTION

The magnetic disk device such as the hard disk drive has a control system to determine the position of the magnetic head. Unfortunately, the control system often suffers so-called RRO (Repeatable Run Out), which is a cyclic disturbance that occurs in synchronism with the rotation of the magnetic disk. This disturbance is due to the fact that the center of the circular tracks formed on the magnetic disk is offset from the center of revolution of the magnetic disk. Therefore, countermeasures against RRO are taken.

One of such countermeasures is disclosed in Japanese Patent Publication No. 2005-353148 ("Patent Document 1"). This disclosure is concerned with a technology to generate PES (Position Error Signal) for the magnetic head, acquire correction data to suppress RRO components, and record correction data, together with servo data, in the track.

Meanwhile, RRO that affects the control system to determine the position of the magnetic head varies in nature depending on the position on the magnetic disk at which the magnetic head is positioned. This means that some tracks among a plurality of tracks formed on the magnetic disk may not need correction data. Recording correction data in all the tracks reduces the region in which user data is recorded and hence reduces the storage capacity of the magnetic disk. In addition, measuring RRO components for all the tracks and recording correction data increases time required for production.

Incidentally, Patent Document 1 mentioned above suggests the recording of correction data in a portion of tracks, but this method does not prevent the magnetic disk from being reduced in storage capacity because the regions for correction data are secured in all the tracks.

BRIEF SUMMARY OF THE INVENTION

Embodiments of the present invention provide a magnetic disk device and a method for production thereof, the magnetic disk device being characterized in that the magnetic disk therein permits a plurality of tracks thereon to record correction data when necessary without decreasing its storage capacity. In the particular embodiment of FIG. 2A, the magnetic disk device is characterized in that the magnetic disk has the first tracks and the second tracks formed thereon, the first tracks having servo data regions 23 arranged cyclically, with a portion of a region between them being the correction data region 25 and the remaining regions being the user data region 27, and the second tracks having the servo data regions 23 arranged cyclically, with the region between them being the user data regions 27, and the multiprocessing unit (MPU) switches the servo extraction timing of the position information sampler depending on whether the track for servo reproduction by the magnetic head is the first track or the second track.

BRIEF DESCRIPTION OF THE DRAWINGS

FIG. 5 is a diagram illustrating the disabled track.

FIG. 6 is a diagram illustrating the disabled track.

DETAILED DESCRIPTION OF THE INVENTION

Figure 1:
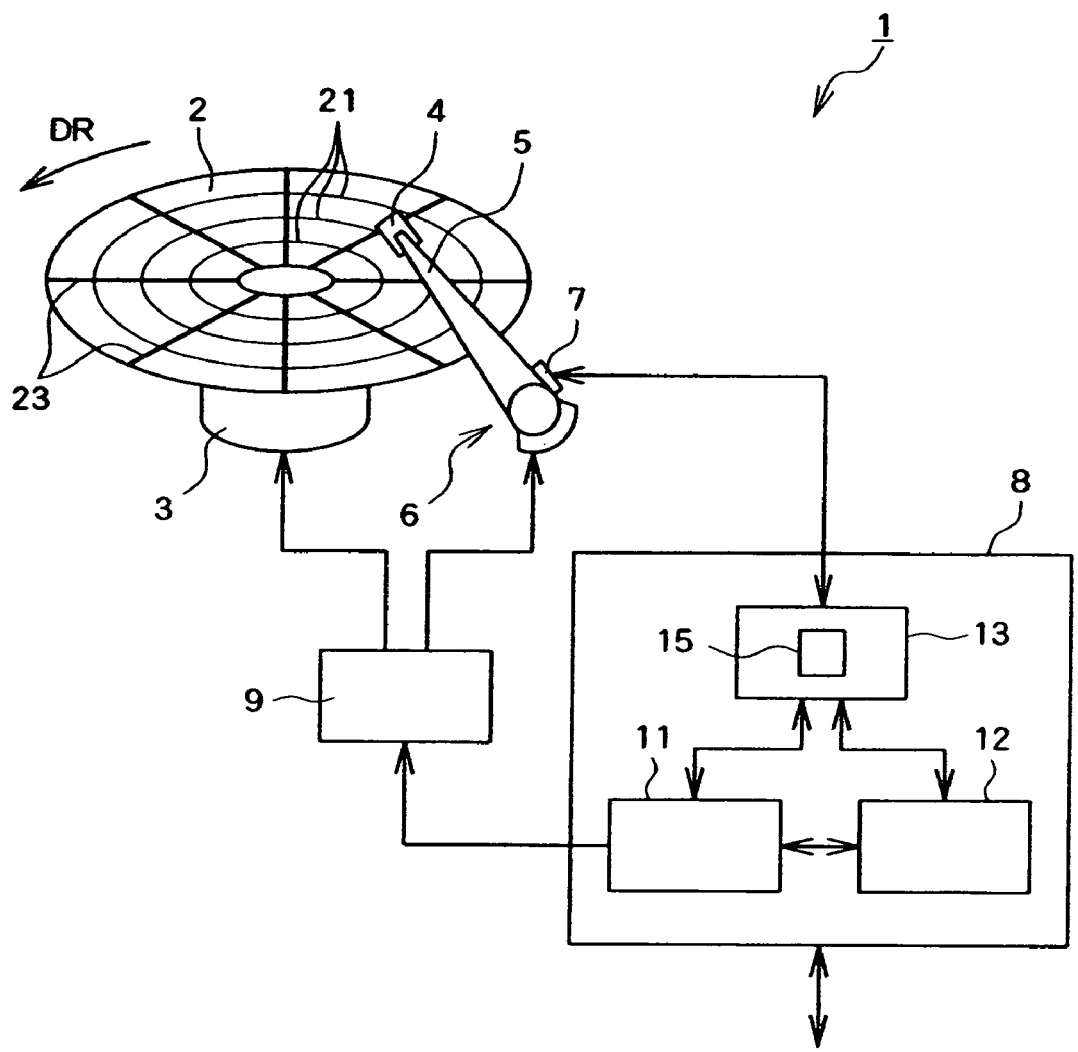
FIG. 1 is a block diagram showing the construction of the magnetic disk device pertaining to one embodiment of the present invention.

The embodiments of the present invention were completed in view of the foregoing. Embodiments of the present invention relate to a magnetic disk device and a method for production thereof. It is an object of embodiments of the present invention to provide a magnetic disk device and a method for production thereof, the magnetic disk device being characterized in that the magnetic disk therein permits a plurality of tracks thereon to record correction data when necessary without decreasing its storage capacity.

According to embodiments of the present invention, to solve certain of the above-mentioned problems, the magnetic disk device includes a magnetic disk having first tracks and second tracks formed thereon, the first tracks having servo data regions for servo data recording which are arranged at a prescribed cycle in the circumferential direction and correction data regions for correction data recording to correct the positioning data generated from the servo data, in a portion of a region between two of the servo data regions, with the remaining regions being user data regions, and the second tracks being constructed such that the servo data regions are arranged at a prescribed cycle in the circumferential direction and the user data regions are in a region between two of the servo data regions; a magnetic head to reproduce data from the tracks on the magnetic disk; an extraction circuit to extract at a prescribed timing a portion of the data reproduced by the magnetic head; a timing controller which, in the case where the first tracks are the tracks for servo reproduction by the magnetic head, causes the extraction circuit to extract the servo data and the correction data contained in the data reproduced by the magnetic head, or which, in the case where the second tracks are the tracks for servo reproduction by the magnetic head, causes the extraction circuit to extract the servo data contained in the data reproduced by the magnetic head; and a positioning controller which generates positioning data based on the servo data extracted by the ex-traction circuit, or which, in the case where the extraction circuit has extracted the correction data, corrects the positioning data based on the correction data, thereby controlling the positioning of the magnetic head.

A magnetic disk device according to particular embodiments of the present invention may be characterized in that the first tracks have the correction data regions formed adjacent to that side of the servo data region which leads in the direction of data reproduction by the magnetic head.

A magnetic disk device of embodiments of the present invention may be characterized in that, in the first tracks, the correction data region has the correction data recorded therein which corrects the positioning data generated from the servo data recorded in the servo data region at a position which goes ahead of the correction data region in the direction of data reproduction by the magnetic head.

A magnetic disk device of embodiments of the present invention may be characterized in that the timing controller generates servo extraction timing to extract the servo data and the correction data contained in data reproduced by the magnetic head in the case where the first track is the track for servo reproduction by the magnetic head, and the timing controller generates servo extraction timing to extract the servo data contained in data reproduced by the magnetic head in the case where the second track is the track for servo reproduction by the magnetic head.

A magnetic disk device of embodiments of the present invention may be characterized in that the timing controller generates servo extraction timing to extract the servo data contained in data reproduced by the magnetic head and also generates correction data extraction timing to extract the correction data contained in data reproduced by the magnetic head in the case where the first track is the track for servo re-production by the magnetic head.

A magnetic disk device of embodiments of the present invention may be characterized by having a target determiner to determine the positioning target for the magnetic head based on instructions received from an external device, the magnetic head having formed therein a first area in which a plurality of the first tracks are arranged in the radial direction and a second area in which a plurality of the second tracks are arranged in the radial direction, and the target determiner preventing the reproducing element of the magnetic head from being positioned at one or more of the second tracks formed near the boundary of the first area among a plurality of the second tracks contained in the second area when instructions relating to data recording are received.

A magnetic disk device of embodiments of the present invention may be characterized in that the target determiner prevents the reproducing element of the magnetic head from being positioned at one or more of tracks where the recording element of the magnetic head is to be positioned if the reproducing element of the magnetic head is positioned at one or more of the second tracks when instructions relating to data recording are received.

A magnetic disk device of embodiments of the present invention may be one which has a magnetic disk and a magnetic head, in which the magnetic disk has a correction data region, in which correction data is recorded to correct the positioning data generated from the servo data, in a portion of the region between two of servo data regions for servo data recording which are arranged at a prescribed cycle in the circumferential direction, and also has the first tracks in which the remaining regions are user regions and the second track in which the region between two of the servo data regions is the user data region, and also has a disabled track in which the second track is excluded from becoming the object of servo reproduction in the case where the track for servo reproduction by the magnetic head is one or more of the second tracks adjacent to the boundary between the first track and the second track.

A magnetic disk device of embodiments of the present invention may be characterized in that the magnetic disk has the region composed of a plurality of the first tracks at the outer-most side.

A magnetic disk device of embodiments of the present invention may be characterized in that the magnetic disk has the region composed of a plurality of the first tracks and the other region composed of the second tracks at the inner side and the outer side of the region.

A magnetic disk device of embodiments of the present invention may be characterized in that the zone on the magnetic disk has the first zone having the first tracks and the second zone having the second tracks.

A magnetic disk device of embodiments of the present invention may be characterized in that information about the disabled track is recorded in a defect registration table.

A method for production of the magnetic disk device according to an embodiment of the present invention may include a servo re-cording step of recording servo data in the magnetic disk and forming a plurality of tracks in which servo data regions are arranged at a prescribed cycle in the circumferential direction, a judgment step of generating positioning data based on the servo data reproduced by the magnetic head from the typical track among a plurality of the tracks which is determined respectively for a prescribed number of tracks arranged in the radial direction, specifying the synchronous components contained in the positioning data which are synchronous with the rotation of the magnetic disk, and judging the necessity of correction of positioning data in a prescribed number of the tracks to which the typical track belongs, and a correction data registration step of generating the positioning data based on the servo data reproduced from the tracks by the magnetic disk, specifying the cyclic components contained in the positioning data, and recording correction data to suppress the cyclic components in a portion of the region between two of the servo data regions in the tracks.

A method for production of the magnetic disk device according to embodiments of the present invention may further include a registration step to register as the disabled track one or more of tracks where the recording element of the magnetic head is to be positioned when the reproducing element of the magnetic head is positioned in one or more tracks formed near the boundary between a prescribed number of tracks in which the correction data is recorded among a prescribed number of tracks in which the correction data is not recorded.

According to embodiments of the present invention, the timing of data extraction is switched between the first track having the correction data region and the second track not having the correction data region. The procedure ensures the length of user data region in the second track. Thus, the magnetic disk device can record correction data when necessary in a plurality of tracks formed in the magnetic disk without reducing the storage capacity of the magnetic disk.

Various embodiments of the present invention will be described below with reference to the accompanying drawings.

FIG. 1 is a block diagram showing an example of the architecture of the magnetic disk device according to embodiments of the present invention. The magnetic disk device 1 is comprised of a magnetic disk 2, a spindle motor 3, a magnetic head 4, a suspension arm 5, a voice coil motor 6 as an actuator of the head, a head amplifier 7, a main circuit 8, and a motor driver 9.

The main circuit 8 includes a microprocessing unit (MPU) 11, a hard disk controller (HDC) 12, and a read/write channel (R/W channel) 13. The R/W channel 13 includes a position information sampler 15 as an extraction circuit.

The magnetic disk 2 is attached to the spindle motor 3, so that it is turned in the direction of arrow DR shown in FIG. 1. The magnetic disk 2 has a plurality of tracks 21 concentrically arranged thereon. Each track 21 has servo data areas 23 which are arranged periodically in the circumferential direction. The tracks 21 arranged on the magnetic disk 2 are classified into the first tracks and the second tracks (which are detailed later).

The magnetic head 4 is comprised of a recording element and a reproducing element; it is positioned above the magnetic disk 2, so that it magnetically records and reproduces data as the tracks 21 move. The magnetic head 4 is supported on the tip of the suspension arm 5. The suspension arm 5 is attached to the voice coil motor 6, so that it swigs around the pivot. This movement causes the magnetic head 4 (which is supported on the tip of the suspension arm 6) to move in the radial direction (approximately) over the magnetic disk 2.

The MPU 11 controls the entire device. It works according to programs stored in the memory (not shown). It determines the target, controls the position, and controls the timing as specified in this embodiment.

The MPU 11 determines the positioning target for the magnetic head 4 upon receipt of recording or reproducing instructions from an external device. More specifically, the recording or reproducing instruction received from an external device contains LBA (Logical Block Addressing) parameters to specify the position for data to be recorded or reproduced according to serial numbers given to the sector. The MPU 11 converts the LBA parameters into the CHS parameters that specify the position for data to be recorded or reproduced in terms of the cylinder number, head number, and sector number. In this way it determines the positioning target of the magnetic head 4. In this step, the MPU 11 references the defect registration table, which is stored in memory (not shown), in order to exclude the tracks registered as disabled tracks from the positioning targets (this will be detailed later).

Functioning as a positioning controller, the MPU 11 drives the voice coil motor 6, thereby causing the magnetic head 4 to move (seek) to the track as the positioning target. At this time, the MPU 11 specifies the present position of the magnetic head 4 according to the track data, sector data, and level value of burst signal in the servo data reproduced by the magnetic head 4, which are received from the position information sampler 15 of the R/W channel 13. Then, the MPU 11 produces the position error signal (PES) that represents the difference between the present position and the positioning target of the magnetic head 4. PES is used for positioning. The MPU 11 converts the thus calculated error signal into the signal to drive the voice coil motor 6 and sends it to the motor driver 9.

Upon receipt of the signal to drive the voice coil motor 6 from the MPU 11, the motor driver 9 sends it to the voice coil motor 6 after analog conversion and amplification. Also, upon receipt of the signal to drive the spindle motor 3 from the MPU 11, the motor driver 9 sends it to the spindle motor 3 after analog conversion and amplification.

The HDC 12 is comprised of an interface controller, an error-correcting circuit, and a buffer controller.

Upon receipt of user data (to be recorded in the magnetic disk 2) from an external device, the HDC 12 sends it to the R/W channel 13. Also, upon receipt of user data (reproduced from the magnetic disk 2) from the R/W channel 13, the HDC 12 sends it to the external device. At this time, the HDC 12 temporarily stores the user data in a buffer memory (not shown) under control from the MPU 11.

Upon receipt of user data from the HDC 12, the R/W channel 13 performs modulation and conversion into analog signals and sends the thus generated recording signals to the head amplifier 7. Upon receipt of reproducing signals (reproduced from the magnetic disk 2) from the head amplifier 7, the R/W channel 13 sends them to the HDC 12 after conversion into digital data and demodulation.

The position information sampler 15 contained in the R/W channel 13 extracts servo data according to prescribed timing from reproduced data from the magnetic disk 2, and then it sends track data, sector data, and level value of burst signals, which are contained in the servo data, to the MPU 11 through the HDC 12. The MPU 11 functions as a timing controller so as to alter the timing of servo ex-traction of the position information sampler 15. Specifically, the MPU 11 sets up and changes the timing of servo extraction to extract servo data from reproduced data and the HDC 12 generates the timing of servo extraction according to such setting (a detailed description of the change of timing of servo extraction will be given later).

Upon receipt of recording signals (to be recorded in the magnetic disk 2) from the R/W channel 13, the head amplifier 7 sends them to the magnetic head 4 after amplification. Also, upon receipt of reproduced signals from the magnetic disk 2, the head amplifier 7 sends them to the R/W channel 13 after amplification.

Figure 2A:
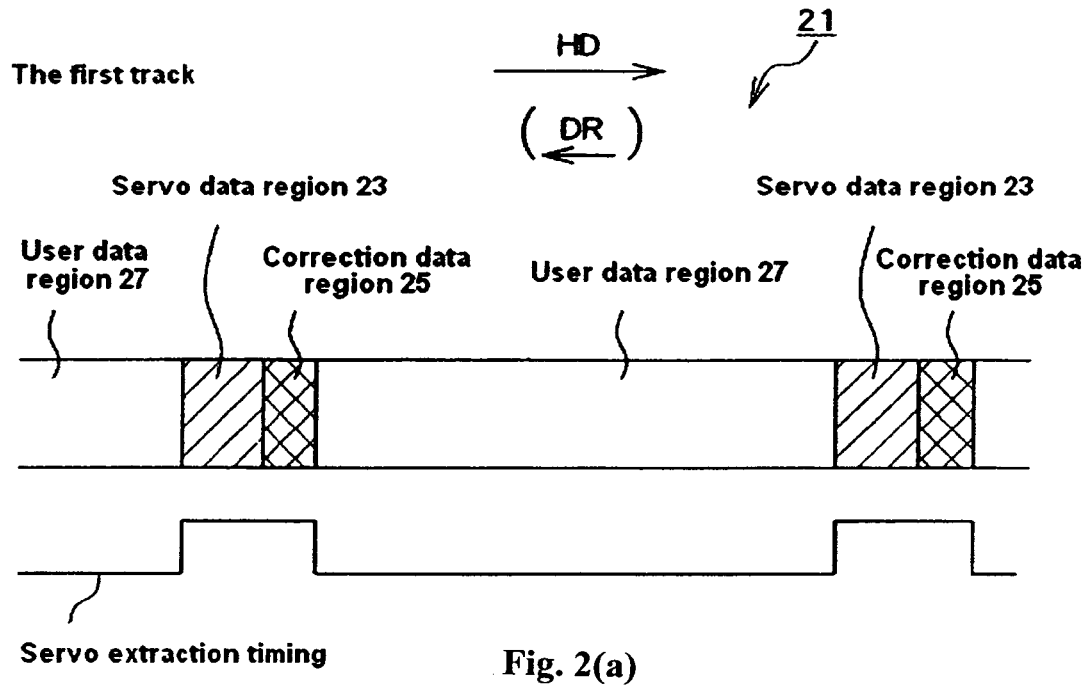
FIGS. 2(A) and 2(B) are diagrams showing the structure of the first and second tracks formed in the magnetic disk and also showing the servo extracting timing for them.
Figure 2B:
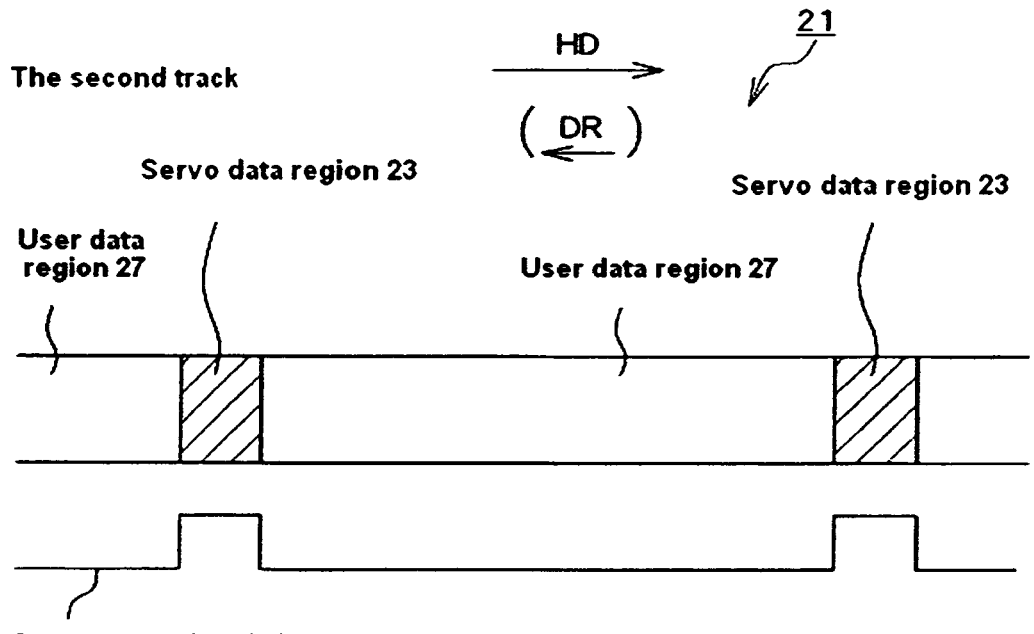

FIGS. 2(A) and 2(B) show examples of the structure of the first track and the second track formed in the magnetic disk 2 and the timing of servo extraction for them. The arrow HD in FIGS. 2(A) and 2(B) denotes the direction in which servo data is reproduced by the magnetic head 4. HD (the direction of reproduction) is opposite to DR (the direction in which the magnetic disk 2 turns).

The magnetic disk 2 is divided into a plurality of zones (regions) which are arranged concentrically, and each zone contains a plurality of tracks 21 which are arranged concentrically. The tracks 21 in each zone are comprised of the first tracks and the second tracks.

The difference between the first tracks and the second tracks is that the former have the correction data region 25 but the latter does not. The correction data region 25 stores correction data to suppress periodic disturbance components (RRO components) contained in PES calculated by the MPU 11.

The magnetic disk 2 according to this embodiment is constructed such that the zone with comparatively many RRO components (referred to as the first zone) is composed of the first tracks and the zone with comparatively few RRO components (referred to as the second zone) is composed of the second tracks. For example, the magnetic disk 2 may be constructed such that the first zone is the zone close to the outer periphery (where usually many RRO components exist) and the second zone is the zones close to the inner and middle peripheries. Conversely, if there is a tendency for the magnetic disk 2 to have many RRO components in the middle and inner zone, the first zone may be assigned to them. Incidentally, the embodiment of the present invention is described on the assumption that the correction data containing RRO components is used when user data is recorded in the user data region 27. However, it may also be applied to the case in which RRO for reproduction (reproducing correction data) is recorded in the user data region 27.

The first track shown in FIG. 2(A) has the servo data regions 23 containing servo data which appear cyclically at certain intervals. The servo data contains servo address marks (SAM), track numbers, and burst signals.

Part of the region between two servo data regions 23 adjacent to each other contains the correction data region 25. In this embodiment, the correction data region 25 is contiguous to that side of the servo data region 23 which leads in the direction of HD (or the direction in which reproduction proceeds). The correction data recorded in each of the correction data regions 25 represents the correction value (RRO correction value) to suppress the RRO components corresponding to the position of the respective servo data regions 23.

The region (excluding the correction data region 25) between the two servo data regions 23 adjacent to each other is the user data region (sector) 27. This user region 27 records a data address mark (DAM) at its head, and DAM is followed by user data.

By contrast, the second track shown in FIG. 2(B) has the servo data region 23 which is formed cyclically at the same intervals as the first track but it does not have the correction data region 25, and the region between the two servo data regions 23 adjacent to each other is entirely the user data region 27. This disk format expands the user data region 27, thereby improving the format efficiency.

The MPU 11 which functions as the timing controller switches the servo extracting timing of the position information sampler 15 depending on whether the track from which servo reproduction is made by the magnetic head 4 is the first track or the second track.

When the magnetic head 4 reproduces data from the first track, the position information sampler 15 is set up such that it extracts the data at the timing of servo data from the servo data region 23 and correction data from the correction data region 25 appearing in the data reproduced by the magnetic head 4, as shown in FIG. 2(A). The position information sampler 15, which has extracted servo data and correction data, sends the MPU 11 track data contained in servo data and RRO correction value contained in correction data.

On the other hand, when the magnetic head 4 reproduces data from the second track, the position information sampler 15 is set up such that it extracts the servo data at the timing of servo data from the servo data region 23 appearing in the data reproduced by the magnetic head 4, as shown in FIG. 2(B). The position information sampler 15, which has extracted servo data, sends the MPU 11 track data contained in servo data.

Here, the MPU 11 judges whether the track for servo reproduction by the magnetic head 4 is the first track or the second track according to the track to be determined as the positioning target by its function to determine the target. The track for servo reproduction is one at which the reproducing element in the magnetic head 4 reads servo data. For example, when MPU 11 receives an instruction for reproduction, the track to be determined as the positioning target for user data reproduction (or the positioning tar-get for the reproducing element of the magnetic head 4) is the track for servo reproduction. Here, there may be an instance where the track for servo reproduction in response to a recording instruction is a track which is a certain distance away in the radial direction from the track as the positioning target for recording (or the positioning target for the recording element of the magnetic head 4). This is because the magnetic head 4 has the reproducing element and the recoding element which are formed apart. This structure may result in an instance where, when the magnetic head 4 is turned by the voice coil motor 6, the reproducing element and the recording element are positioned at different tacks (or positions offset in the radial direction due to their skew angle). Consequently, if the skew angle is zero, both the reproducing element and the recording element are positioned at the same track.

The MPU 11 judges whether the track for servo reproduction is the first track or the second track by referencing the RRO table stored in memory (not shown) contained in the main circuit 8 according to the track to be determined as the positioning target. The RRO table specifies whether the track formed on the magnetic disk 2 is either the first track or the second track. To be concrete, it specifies that each zone divided in the magnetic disk 2 contains either of the first track and the second track.

Incidentally, according to this embodiment, the first track has the correction data region 25 adjacent to that side of the servo data region 23 which leads in the direction of HD (or the direction in which reproduction proceeds). Therefore, the MPU 11 can extract servo data and correction data all at once from the first track simply by extending the length of the timing for servo extraction by the position information sampler 15 in the case where the first track is the object of servo reproduction than that in the case where the second track is the object for servo reproduction.

Next, the MPU 11 which functions as the position determining controller causes the magnetic head 4 to seek a track as the positioning target and then positions the magnetic head 4 on this track.

In the case where the magnetic head 4 is positioned on the first track and servo data is reproduced from the first track, the MPU 11 receives track data and RRO correction values from the position information sampler 15. Thus, the MPU 11 identifies the present position of the magnetic head 4 according to track data etc., and corrects PES according to RRO correction values.

On the other hand, in the case where the MPU 11 positions the magnetic head 4 on the second track so that servo data is reproduced form this second track, the MPU 11 receives track data etc. from the position information sampler 15 and hence it identifies the present position of the magnetic head 4 according to track data etc. and calculates PES.

Then, the MPU 11 utilizes the thus obtained PES to generate signals to drive the voice coil motor 6 and sends the driving signals to the motor driver 9. In this way the MPU 11 drives the voice coil motor 6 and positions the magnetic head 4 on the track as the positioning target.

Incidentally, there is timing other than timing for servo extraction by the position information sampler 15. In other words, there is timing in which neither servo data nor correction data appears in the data reproduced by the magnetic head 4. In this case, user data reproduced from the user data region 27 is sent to an external device through the HDC 12 (as reproducing action) or user data entered from an external device is recorded in the user data region 27 through the HDC 12 (as recording action).

The second track is constructed such that the user data region 27 is longer than that in the first track which contains the correction data region 25, and this stricture reduces timing of servo extraction by the position information sampler 15. Thus the user data region 27 stores more user data and permits its reproduction.

Figure 3:
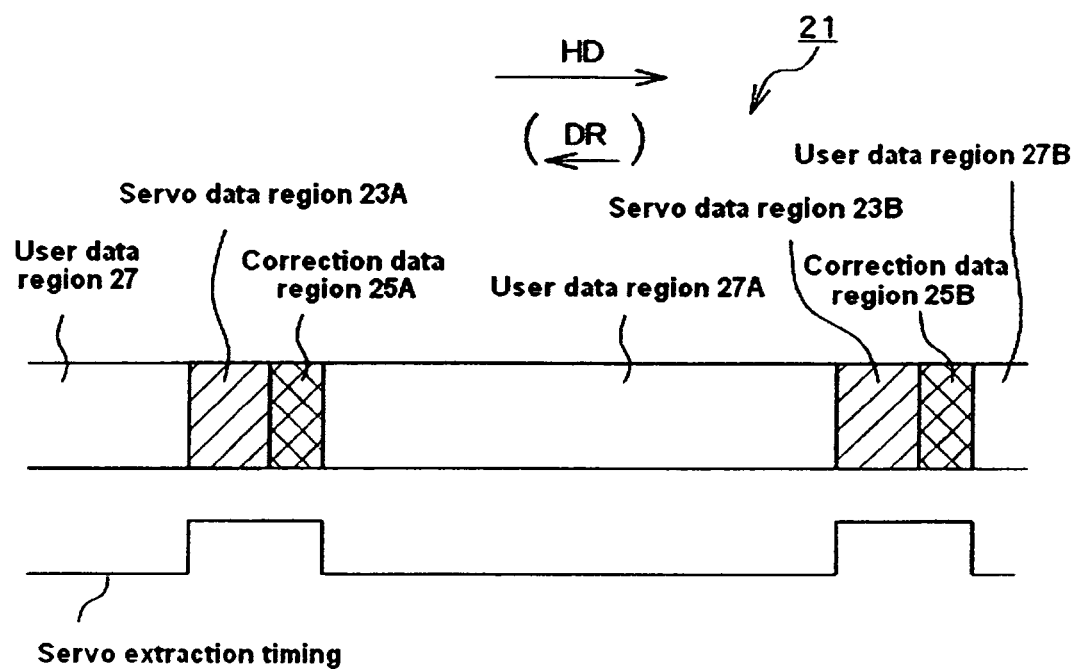
FIG. 3 is a diagram illustrating the first track.

Incidentally, according to this embodiment, the correction data region 25A of the first track stores correction data to correct PES generated from servo data stored in the servo data region 23B (or the servo data region 23 to be reproduced after the servo data region 23A) which is ahead of the correction data region 25A (in the direction of HD for reproduction), as shown in FIG. 3. In this case, the MPU 11 receives from the position information sampler 15 the RRO correction value for correction data to be re-produced from the correction data region 25A and holds the RRO correction value while recording action or reproducing action continues for the user data region 27A that follows. Then, the MPU 11 receives from the position information sampler 15 track data for servo data to be reproduced from the servo data region 23B, calculates PES according to the track data, and corrects the PES by using the RRO value which has been stored. And the MPU 11 executes the recording action (or reproducing action) for the user data region 27B that follows in response to the position control after RRO correction.

Figure 4A:
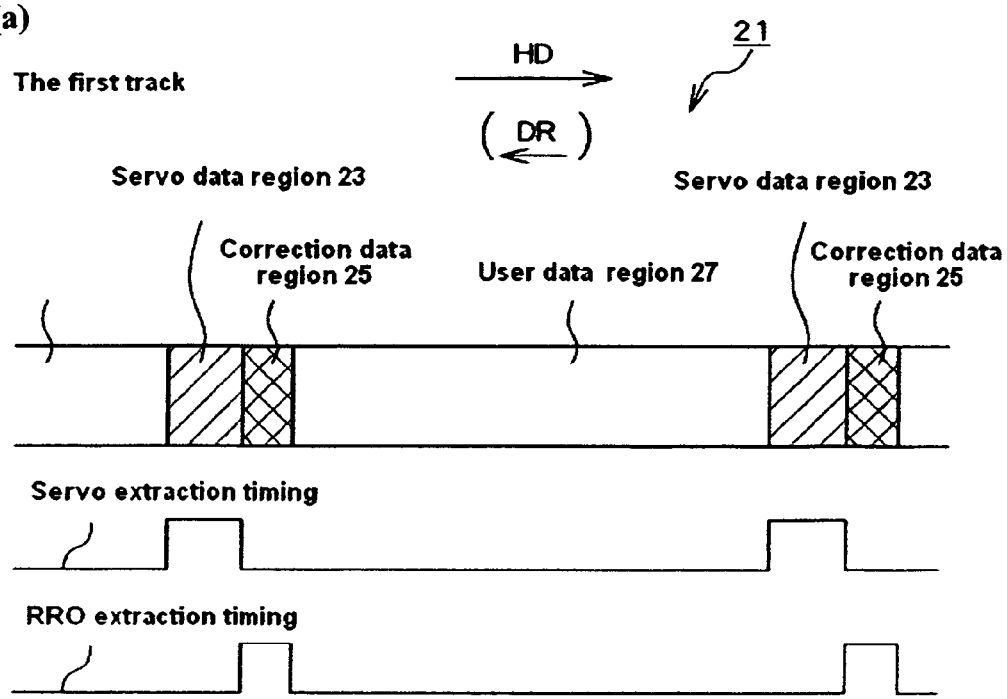
FIGS. 4(A) and 4(B) are diagrams showing the timing of servo ex-traction and RRO extraction.
Figure 4B:
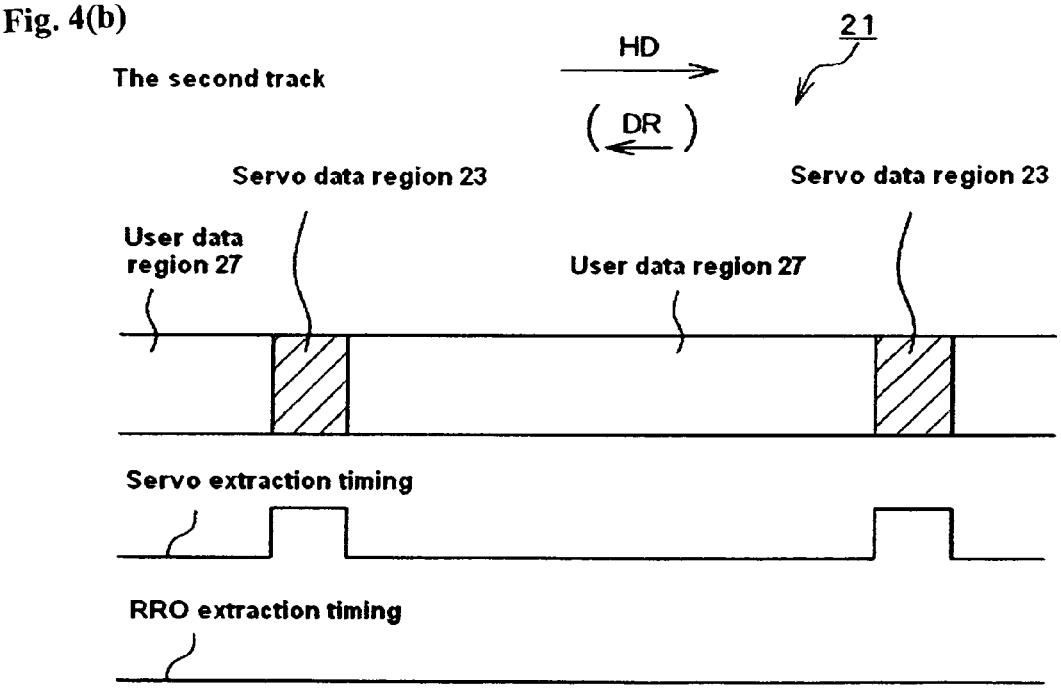

This embodiment employs the system in which the timing of servo extraction is switched depending on whether the track for servo reproduction by the magnetic head 4 is the first track or the second track. However, there is another system in which the timing of servo extraction is held constant. In this case, the MPU 11 sets up or alters the timing of RRO extraction (RRO gate) to extract correction data from reproduced data separately from the timing of servo extraction (servo gate), and the HDC 12 generates the timing of RRO extraction according to such setting. Specifically, when the magnetic head 4 reproduces data from the first track, the MPU 11 sets up the timing of RRO ex-traction which coincides with the timing at which correction data from the correction data region 25 appears in correction data and then acquires the correction data, as shown in FIG. 4(A). On the other hand, the MPU 11 does not set the timing of RRO extraction in the case where the magnetic head 4 reproduces data from the second track, as shown in FIG. 4(B).

The disabled track will be described below with reference to FIGS. 5 and 6.

According to this embodiment, the magnetic disk 2 is comprised of the first zone, in which there are comparatively many RRO components, and the second zone, in which there are comparatively few RRO components, as mentioned above. Therefore, in the case where the track for servo reproduction is one or more of the second tracks existing in the neighborhood of the boundary between the first zone and the second zone, there is the possibility that the PES generated from the servo data reproduced from the second track contains a nonnegligible amount of RRO components because the second track does not have the correction data region 25. Data recording in this situation may cause a problem with off-track write (or data writing outside the track), as shown in FIG. 5.

There are two cases in which the track for servo reproduction is the first track or the second track adjacent to the boundary between the first zone and the second zone. PES tends to be larger in the latter case than in the former case. This may lead to a mismatch of PES level in the boundary or the neighborhood of the boundary. In the case where data for servo reproduction is recorded in the second track adjacent to the boundary, the foregoing mismatch may pose a problem with off-write in the track adjacent to the track used for recording which is close to the first zone. Another possible problem in the track adjacent to the track used for recording which is close to the first zone is track interference due to repeated recording actions, which might be serious.

The foregoing is illustrated in FIG. 5. The dotted line in each track denotes the locus drawn by the recording element 33 of the magnetic head 4 which is positioned on the track near the boundary. Incidentally, FIG. 5 shows the case in which the reproducing element 31 and the re-cording element 33 suffer offset over three tracks in the radial direction. It is noted that the locus of the re-cording element 33 fluctuates more in the case where the reproducing element 31 is positioned on the second track near the boundary than in the case where the reproducing element 31 is positioned on the first track near the boundary.

So, upon receipt of an instruction for data recording, the MPU 11, which functions to determine the target, prohibits the reproducing element 31 of the magnetic head 4 from being positioned at one or more the second tracks near the boundary between the first zone and the second zone, as shown in FIG. 6. That is, if the reproducing element 31 of the magnetic head 4 is positioned on one or more of the second tracks, the MPU 11 prohibits the recording element 33 of the magnetic head 4 from being positioned on them. And, the MPU 11 excludes the recording prohibited track from the objects at which the recording element 33 of the magnetic head 4 is positioned, upon receipt of an instruction for data recording. In this way the problem with offset-write is avoided. Better results will be achieved by designating one or more tracks (mentioned above) and their neighboring tracks as recording prohibited tracks, so that recording prohibited tracks expand to a certain width.

To illustrate the foregoing, FIG. 6 shows an example in which, when the reproducing element 31 of the magnetic head 3 is positioned on the second track adjacent to the boundary, the recording prohibited track is the track on which the recording element 33 of the magnetic head 4 is to be positioned. The recording prohibited track separates the recording tracks (the first track and the second track) in distance by one track in the area where the mismatch of PES occurs as mentioned above, thereby solving the problem with off-track. Incidentally, the foregoing example illustrates the reproducing element 31 and the recording element 33 suffering offset over three tracks in the radial direction due to the skew angle mentioned above.

In addition, since no data is recorded in the re-cording prohibited track, reproduction from the recording prohibited track should also be prohibited. So, upon receipt of an instruction for data reproduction, the MPU 11 which determines the target, prohibits the reproducing element 31 of the magnetic head 4 from being positioned on the recording prohibited track. That is, the recording prohibited track functions also as the reproducing prohibited track. Thus, upon receipt of an instruction for re-production, the MPU 11 excludes the reproducing prohibited track from the targets on which the reproducing element 31 of the magnetic head 4 is positioned. The track which functions as both recording prohibited track and reproducing prohibited track will be called the disabled track hereinafter.

Information about the disabled track (or any track for servo reproduction at its position) is described in the defect registration table stored in memory (not shown) in the main circuit 8. The MPU 11 receives an instruction for recording or reproduction from an external device and converts LBA parameter contained therein into CHS parameter by referencing the defect registration table, so that it excludes the track which is registered as the disabled track (or the track for servo reproduction at the position corresponding to the disabled track) from the positioning targets.

Figure 7:
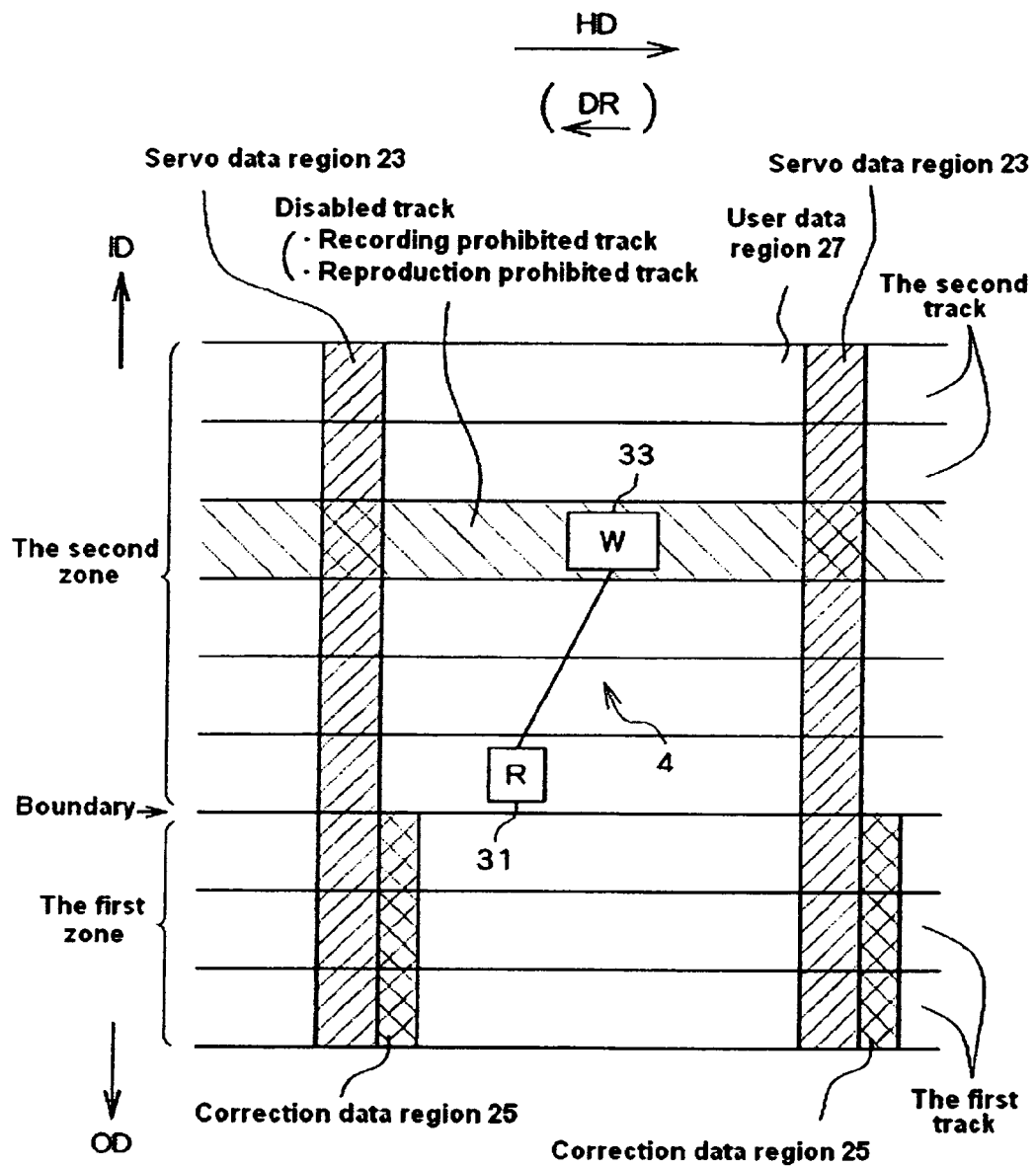
FIG. 7 is a diagram illustrating the disabled track.
Figure 8:
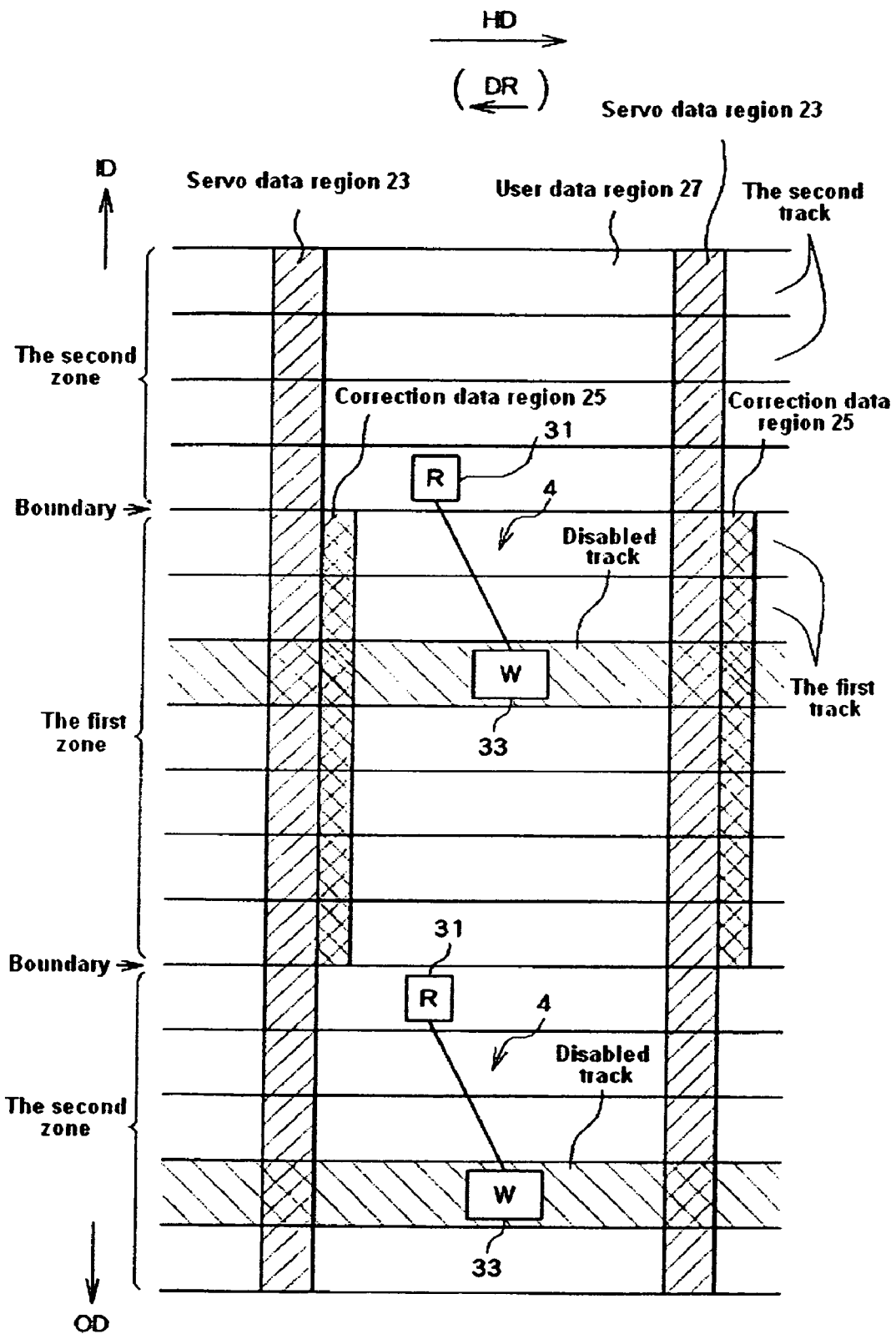
FIG. 8 is a diagram illustrating the disabled track.

Incidentally, FIG. 6 shows an example in which the recording element 33 of the magnetic head 4 is positioned closer to the first zone than the reproducing element 31 of the magnetic head 4. Embodiments of the present invention are not limited to this example. As shown in FIG. 7, in another example in which the recording element 33 of the magnetic head 4 is positioned closer to the second zone than the reproducing element 31 of the magnetic head 4, it is possible to arrange the disabled track. In addition, FIGS. 6 and 7 show examples in which the first zone is only at the OD side. However, in the case where the first zone exists only in MD (near the middle of the disk), it is possible to arrange the disabled track next to the boundaries at both sides of the first zone, as shown in FIG. 8.

Figure 9:
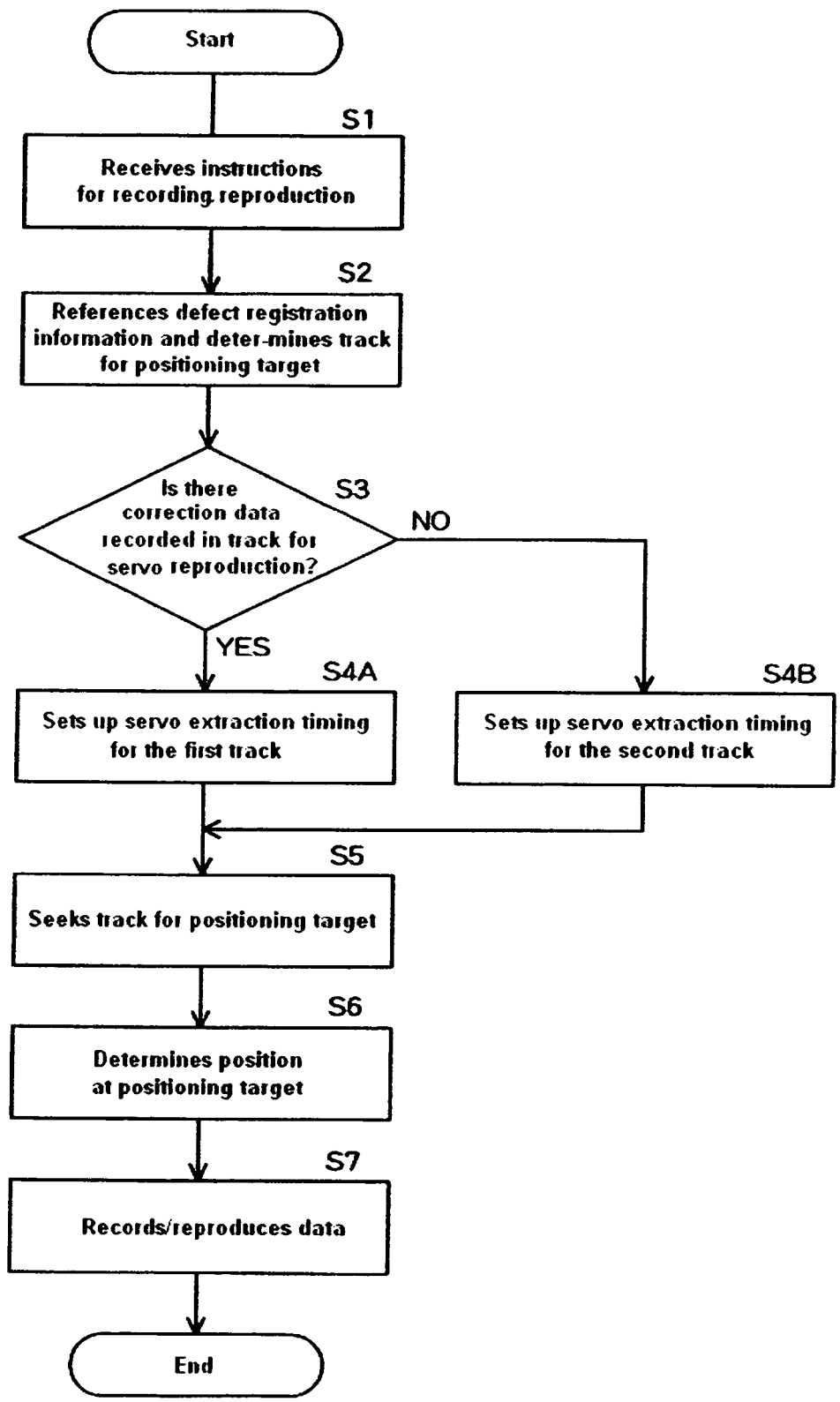
FIG. 9 is a flowchart showing an example of the control of the magnetic disk device pertaining to one embodiment of the present invention.

The above-mentioned actions of the magnetic disk device 1 will be described below with reference to the flow-chart shown in FIG. 9.

Steps S1 and S2 are for the MPU 11 to function as the target determiner. First, the MPU 11 receives from an external device an instruction for recording or reproduction. (S1) Then, the MPU 11 converts LBA parameter contained in the instruction into CHS parameter by referencing the defect registration table stored in memory and deter-mines the track as the positioning target for the magnetic head 4. (S2) The defect registration table lists the disabled tracks (or the corresponding tracks for servo reproduction), and the MPU 11 excludes them from the positioning targets for the magnetic heads 4.

Steps S3 and S4 are for the MPU 11 to function as the timing controller. The MPU 11 judges whether the track for servo reproduction by the magnetic head 4 is the first track or the second track, based on the track as the positioning target by referencing the RRO table stored in memory. (S3)

If the track for servo reproduction is the first track (S3: YES), the MPU 11 switches the timing for servo ex-traction by the position information sampler 15 to the timing for extraction of servo data and correction data to be reproduced by the magnetic head 4. (S4A) On the other hand, if the track for servo reproduction is the second track (S3: NO), the MPU 11 switches the timing for servo extraction by the position information sampler 15 to the timing for extraction of servo data to be reproduced by the magnetic head 4. (S4B)

In the mode of switching the timing for RRO extraction mentioned above (FIG. 4), the MPU 11 sets up the timing at which correction data appears in reproduction data as the timing for RRO extraction if the track for servo reproduction is the first track but does not set up the timing for RRO extraction if the track for servo reproduction is the second track.

Steps S5 and S6 are for the MPU 11 to function as the position determiner. The MPU 11 controls the speed of the voice coil motor 6, generates PES based on servo data entered from the position information sampler 15, and causes the magnetic head 4 to seek the track which has been deter-mined as the position target by driving the voice coil motor 6. (S5)

Then, the MPU 11 determines the position of the magnetic head 4 on the track which has been determined as the positioning target. (S6) If the track for servo reproduction is the first track, the MPU 11 specifies the present position of the magnetic head 4 based on track data etc., calculates PES, corrects the PES based on RRO correction value, drives the voice coil motor 6 based on the results of PES, and determines the position of the magnetic head 4. By contrast, if the track for servo reproduction is the second track, the MPU 11 specifies the present position of the magnetic head 4 based on track data etc. and calculates PES, drives the voice coil motor 6 based on the resulting PES, and determines the position of the magnetic head 4.

The magnetic head 4 is positioned on the track for positioning target. Then, the user data entered from an external device is recorded in the sector of the track through the HDC 12, or the user data reproduced from the sector of the track is sent to an external device through the HDC 12. (S7)

According to the embodiments of the present invention, the magnetic disk device is produced by the method de-scribed below with reference to FIG. 10. The following description does not cover the entire process of producing the magnetic disk device but concentrates on the step of forming the first and second tracks (shown in FIGS. 2(A) and 2(B)) on the magnetic disk incorporated into the magnetic disc device.

Figure 10:
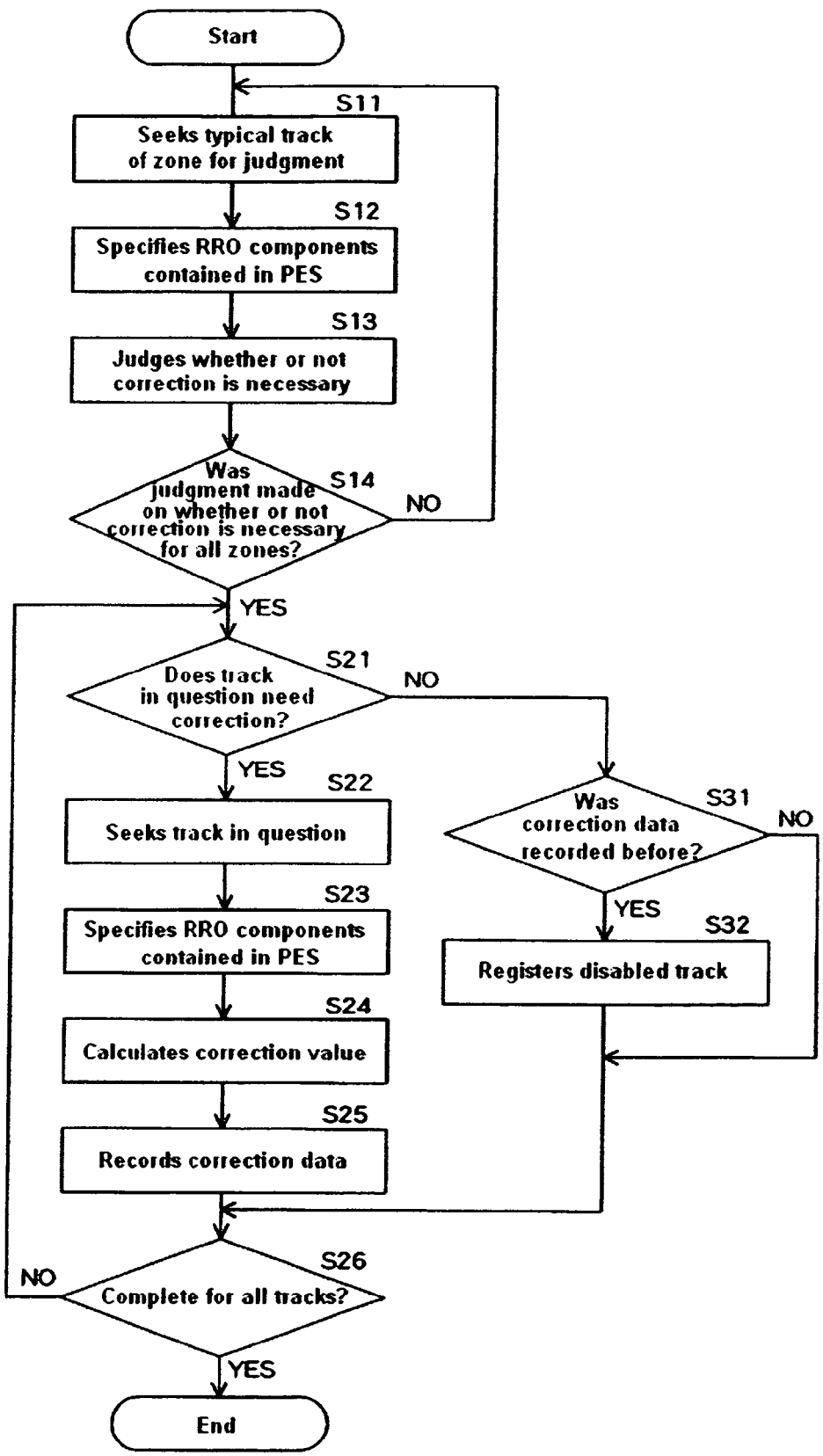
FIG. 10 is a flowchart showing an example of the method for producing the magnetic disk device pertaining to one embodiment of the present invention.

The steps shown in FIG. 10 are applied to the magnetic disk device which has previously been incorporated with all components. Specifically, the magnetic disk device is one which has the same structure as the magnetic disk device 1 shown in FIG. 1 except for the content recorded in the magnetic disk. These steps can be carried out by using the functions of the magnetic disk device. That is, they are completed when the MPU incorporated into the magnetic disk device executes a prescribed program according to an externally given instruction.

The magnetic disk has servo data which has previously been recorded by the servo track writer and also has a plurality of tracks formed thereon. (Servo recording step) As the result of this step, each track formed on the magnetic disk has the servo data regions (which record servo data) arranged cyclically at prescribed intervals along the circumference as shown in FIG. 2.

Steps 11 to S14 are judgment steps. The magnetic disk has a plurality of zones (regions) which are concentrically divided, and each zone contains a prescribed number of tracks which are concentrically arranged. Each zone has a typical track which represents a prescribed number of tracks, and this typical track is used in the judging step.

The MPU causes the magnetic head to seek the typical track of the zone for judgment. (S11). The servo data reproduced from the typical track by the magnetic head is used to generate PES, and the RRO component contained in PES is specified. (S12) Specifically, the magnetic head reproduces the servo data recorded in the typical track through more than one turn, thereby generating PES, and specifies the variation of PES (which occurs in synchronism with the rotation of the magnetic head) as the RRO component. During this step, the MPU also drives the voice coil motor according to PES to position the magnetic head.

The MPU compares the magnitude of the specified RRO component with the threshold value. If the former is lager than the latter, the MPU judges that the RRO component contained in PES needs correction in the zone to which the typical track belongs. In the reverse case, the MPU judges that the RRO component contained in PES needs no correction in the zone to which the typical track belongs (S13). The result of judgment is recorded in the judgment result table stored in internal memory (contained in the magnetic disk device) or external memory. The judgment result table indicates whether or not the RRO component for each zone needs correction. Incidentally, this judgment result table can also be used as the RRO table.

The MPU applies Steps S11 to S13 to the typical track of all zones and judges for all zones whether or not the RRO component needs correction (S14).

In this embodiment, judgment for the necessity of correction is made from one typical track in the zone. However, the embodiment may be modified such that judgment for the necessity of correction is made from a plurality of typical tracks in the zone.

Steps S21 to S26 are intended to record correction data. To this end, these steps select tracks for data recording (sequentially inward or outward) from all the tracks formed on the magnetic disk and repeat the following procedure.

The MPU judges whether or not correction of RRO components is necessary in the zone to which the track in question belongs, by referencing the judgment result table mentioned above (S21). If correction is necessary (S21: YES), the MPU causes the magnetic head to seek the track in question (S22), generates PES based on the servo data re-produced from the track by the magnetic head, and specifies RRO components contained in PES (S23).

The MPU calculates RRO correction value to suppress RRO components according to the size of RRO components specified by PES (S24). The RRO components are calculated according to the position of respective servo data regions which are formed in prescribed cycles on the track in question.

The MPU causes the magnetic head to record the thus calculated RRO correction values (as correction data) next to the servo data region of the track in question (S25). The correction data is recorded such that one to correct PES generated from the servo data recorded precedes (in the direction of reproduction) the servo data region. Thus the track in question becomes the first track mentioned above.

Conversely, if the MPU judges that correction of RRO components is not necessary in the zone to which the track in question belongs (S21: NO), it skips Steps S22 to S25. Thus the track in question becomes the second track mentioned above.

The MPU applies Steps S21 to S25 to all the tracks formed on the magnetic disk (S26).

Steps S31 and S32 are steps for registration. When the track in question moves from the zone containing the first track, in which correction data is recorded, to another zone containing the second track, in which correction data is not recorded, (S21: NO, S31: YES), the MPU registers the disabled track, which is determined based on their boundary, in the above-mentioned defect registration table (S32). In other words, the disabled track to be registered is one or more of the first tracks at which the recording element of the magnetic head is positioned when the reproducing element of the magnetic head is positioned at one or more of the second tracks formed near the boundary of the zone containing the second track.

This embodiment is concerned with the case in which the disabled track is registered when the track in question moves from the zone containing the first track to the zone containing the second track. If it is desirable that the disabled track be registered when the track in question moves from the zone containing the second track to the zone containing the first track, the object is achieved by placing S32 and an additional step between S21 and S26, the additional step making judgment in an opposite way to S31 or judging "whether or not correction data was not recorded in the previous track in question".

The production method according to the above-mentioned embodiment includes the step of judging whether or no correction contained in PES is necessary for the typical track of each zone in the magnetic disk, thereby judging the necessity of correction for each zone, and subsequently calculating and recording only correction data in the zone which needs correction. This method reduces time required for production.

For further time reduction, modification may be made such that Steps S11 to S14 are performed on only one of a plurality of magnetic disks, thereby preparing the judgment result table, and omitting Steps S11 to S14 by referencing this judgment result table for other magnetic disk devices.

What is claimed is:

1. A magnetic disk device comprising:
    a magnetic disk having first tracks and second tracks formed thereon, said first tracks having servo data regions for servo data recording which are arranged at a prescribed cycle in the circumferential direction and correction data regions for correction data recording to correct the positioning data generated from said servo data, in a portion of a region between two of said servo data regions, with the remaining regions being user data regions, and said second tracks being constructed such that said servo data regions are arranged at a prescribed cycle in the circumferential direction and said user data regions are in a region between two of said servo data regions;
    a magnetic head configured to reproduce data from said tracks on said magnetic disk;
    an extraction circuit configured to extract at a prescribed timing a portion of the data reproduced by said magnetic head;
    a timing controller which, in the case where said first tracks are the tracks for servo reproduction by said magnetic head, is configured to cause said extraction circuit to extract said servo data and said correction data contained in the data reproduced by said magnetic head, or which, in the case where said second tracks are the tracks for servo reproduction by said magnetic head, causes said extraction circuit to extract said servo data contained in the data reproduced by said magnetic head; and
    a positioning controller configured to generate positioning data based on said servo data extracted by said extraction circuit, or which, in the case where said extraction circuit has extracted said correction data, corrects said positioning data based on said correction data, thereby controlling the positioning of said magnetic head.

2. The magnetic disk device as defined in claim 1, wherein said first tracks have said correction data regions formed adjacent to a side of said servo data region which leads in the direction of data reproduction by said magnetic head.

3. The magnetic disk device as defined in claim 1, wherein, in said first tracks, said correction data region has said correction data recorded therein which corrects the positioning data generated from said servo data recorded in said servo data region at a position which goes ahead of said correction data region in a direction of data reproduction by said magnetic head.

4. The magnetic disk device as defined in claim 1, wherein said timing controller is configured to generate servo extraction timing to extract said servo data and said correction data contained in data reproduced by said magnetic head in the case where said first track is the track for servo reproduction by said magnetic head, and said timing controller generates servo extraction timing to extract said servo data contained in data reproduced by said magnetic head in the case where said second track is the track for servo reproduction by said magnetic head.

5. The magnetic disk device as defined in claim 1, wherein said timing controller is configured to generate servo extraction timing to extract said servo data contained in data reproduced by said magnetic head and also generates correction data extraction timing to extract said correction data contained in data reproduced by said magnetic head in the case where said first track is the track for servo reproduction by said magnetic head.

6. The magnetic disk device as defined in claim 1, which further comprises:
    a target determiner configured to determine a positioning target for said magnetic head based on instructions received from an external device,
    said magnetic disk having formed therein a first area in which a plurality of said first tracks are arranged in the radial direction and a second area in which a plurality of said second tracks are arranged in the radial direction, and said target determiner preventing a reproducing element of said magnetic head from being positioned at one or more of said second tracks formed near the boundary of said first area among a plurality of said second tracks contained in said second area when instructions relating to data recording are received.

7. The magnetic disk device as defined in claim 6, wherein said target determiner prevents the reproducing element of said magnetic head from being positioned at one or more of tracks where a recording element of said magnetic head is to be positioned if the reproducing element of said magnetic head is positioned at one or more of said second tracks when instructions relating to data recording are received.

8. A magnetic disk device having a magnetic disk and a magnetic head, the magnetic disk comprising:
   a correction data region, in which correction data is recorded to correct positioning data generated from servo data, in a portion of a region between two of servo data regions for servo data recording which are arranged at a prescribed cycle in a circumferential direction, and also has first tracks in which remaining regions are user regions and second tracks in which the region between two of said servo data regions is said user data region, and
   a disabled track in which one of said second tracks is excluded from becoming an object of servo reproduction in the case where a track for servo reproduction by said magnetic head is one or more of the second tracks adjacent to a boundary between one of said first tracks and a zone including said one of said second tracks.

9. The magnetic disk device as defined in claim 8, wherein said magnetic disk has the region comprising a plurality of said first tracks at the outermost side.

10. The magnetic disk device as defined in claim 8, wherein said magnetic disk has the region comprising a plurality of said first tracks and the other region comprising the second tracks at the inner side and the outer side of said region.

11. The magnetic disk device as defined in claim 8, wherein said magnetic disk has a first zone comprising comparatively more Repeatable Run Out (RRO) components than the zone, the first zone having said first tracks.

12. The magnetic disk device as defined in claim 8, wherein information about said disabled track is recorded in a defect registration table.

13. A method for production of a magnetic disk device, said method comprising
   a servo recording step of recording servo data in a magnetic disk and forming a plurality of tracks in which servo data regions are arranged at a prescribed cycle in a circumferential direction,
   a judgment step of generating positioning data based on said servo data reproduced by a magnetic head from a typical track among a plurality of said tracks which is determined respectively for a prescribed number of tracks arranged in a radial direction, specifying synchronous components contained in said positioning data which are synchronous with rotation of said magnetic disk, and judging a necessity of correction of positioning data in a prescribed number of said tracks to which said typical track belongs, and
   a correction data registration step of, for the positioning data in the prescribed number of said tracks determined to be corrected, generating said positioning data based on said servo data reproduced from said tracks by said magnetic disk, specifying cyclic components contained in said positioning data, and recording correction data to suppress said cyclic components in a portion of a region between two of said servo data regions in said tracks, method further comprises a registration step to register as a disabled track one or more of tracks where a recording element of a magnetic head is to be positioned when a reproducing element of said magnetic head is positioned in one or more tracks formed near a boundary between a prescribed number of tracks in which said correction data is recorded among a prescribed number of tracks in which said correction data is not recorded.

* * * * *